United States Patent
Tanskanen et al.

(10) Patent No.: US 8,515,818 B2
(45) Date of Patent: Aug. 20, 2013

(54) METHOD, USER INTERFACE, APPARATUS, SERVER, SYSTEM, AND COMPUTER PROGRAM FOR PROVIDING A MAP VIEW

(75) Inventors: Erkki Juhani Tanskanen, Helsinki (FI); Heidi Marianne Wahl, Helsinki (FI)

(73) Assignee: Nokia Corporation, Espoo (FI)

( * ) Notice: Subject to any disclaimer, the term of this patent is extended or adjusted under 35 U.S.C. 154(b) by 84 days.

(21) Appl. No.: 12/597,604

(22) PCT Filed: Jun. 25, 2007

(86) PCT No.: PCT/IB2007/001879
§ 371 (c)(1),
(2), (4) Date: Mar. 9, 2010

(87) PCT Pub. No.: WO2008/132537
PCT Pub. Date: Nov. 6, 2008

(65) Prior Publication Data
US 2010/0191614 A1     Jul. 29, 2010

Related U.S. Application Data

(60) Provisional application No. 60/914,088, filed on Apr. 26, 2007.

(51) Int. Cl.
*G06Q 30/00* (2012.01)
(52) U.S. Cl.
USPC .......................................................... 705/26.1
(58) Field of Classification Search
USPC ................................................. 705/26–27.2
See application file for complete search history.

(56) References Cited

U.S. PATENT DOCUMENTS

| | | | | |
|---|---|---|---|---|
| 2002/0156739 A1* | 10/2002 | Hirai et al. | | 705/52 |
| 2003/0036845 A1* | 2/2003 | Nakane et al. | | 701/208 |
| 2003/0045997 A1* | 3/2003 | Nakane et al. | | 701/202 |
| 2004/0002812 A1* | 1/2004 | Yamanaka | | 701/208 |
| 2006/0142027 A1* | 6/2006 | Krishnamurthi et al. | | 455/457 |
| 2008/0005734 A1* | 1/2008 | Poristoin et al. | | 717/168 |
| 2008/0177471 A1* | 7/2008 | Deurwaarder et al. | | 701/210 |

FOREIGN PATENT DOCUMENTS

| | | |
|---|---|---|
| EP | 1555511 A | 7/2005 |
| EP | 1679489 A | 7/2006 |
| EP | 1681536 A | 7/2006 |

OTHER PUBLICATIONS

"Intermap Technologies' Accuterra GPS. Maps Now Available on App Store." (Business Wire, Sep. 21, 2009).*

"International Search Report and the Written Opinion of the International Searching Authority", received in corresponding PCT Application No. PCT/IB2007/001879, Dated Dec. 13, 2007, 24 pages.

\* cited by examiner

*Primary Examiner* — Jeffrey A Smith
*Assistant Examiner* — Ethan D Civan
(74) *Attorney, Agent, or Firm* — Harrington & Smith

(57) ABSTRACT

A method for providing a map view is disclosed. The method comprises enabling selection of a departure and a destination among a plurality of location items; determining a route between the selected departure and the selected destination; determining necessary maps for covering said route; determining locally unavailable maps among said necessary maps; and acquiring said locally unavailable maps. Corresponding apparatus, server, system, user interface, and computer program are also disclosed.

19 Claims, 6 Drawing Sheets

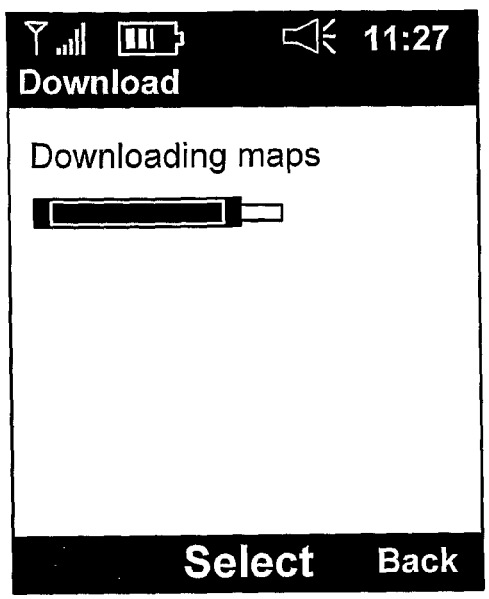
Fig. 2i
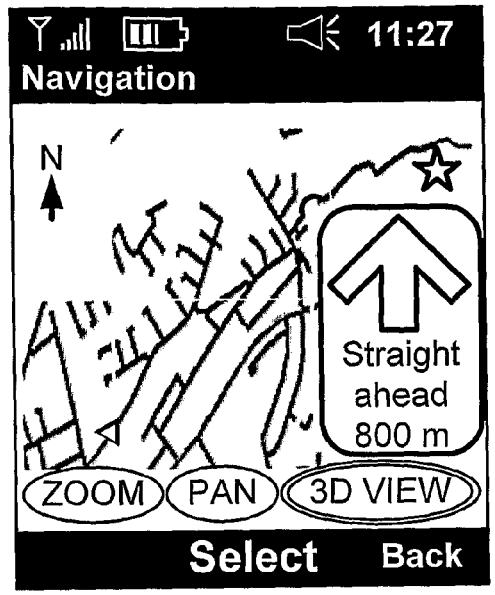
Fig. 2j
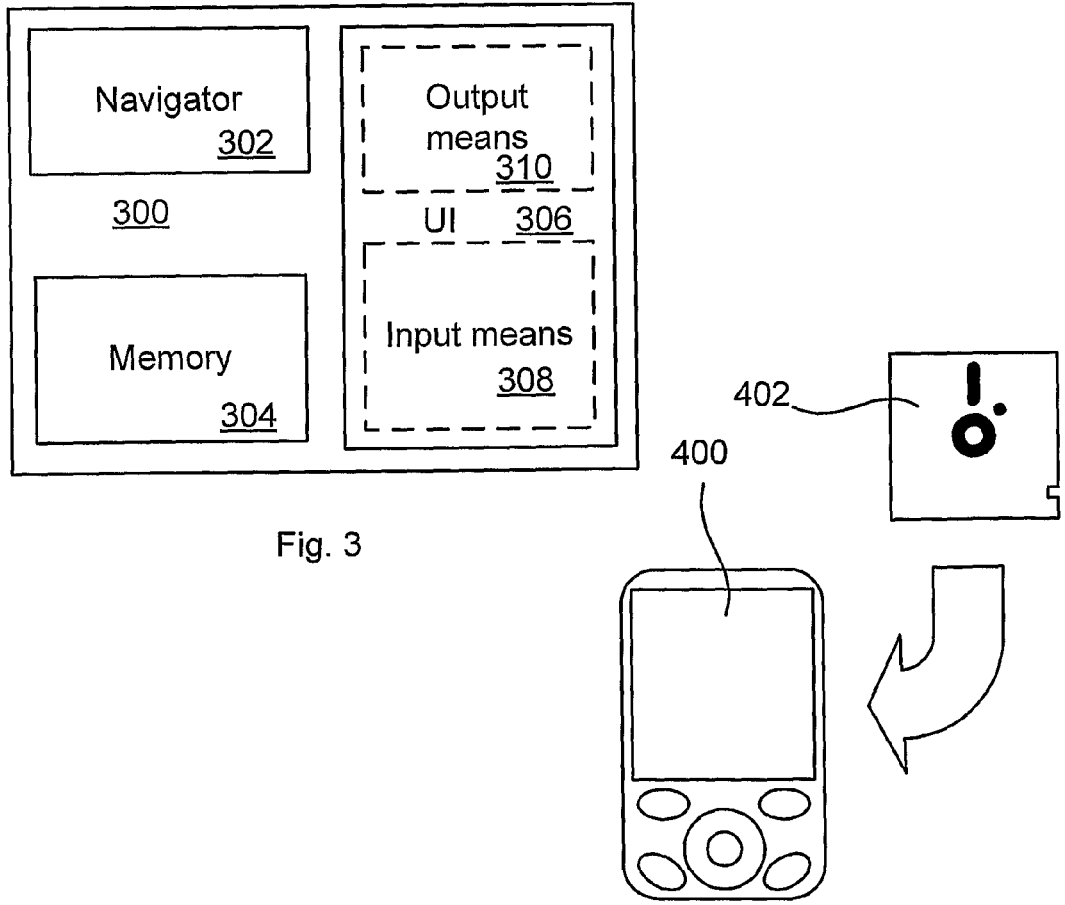
Fig. 3
Fig. 4

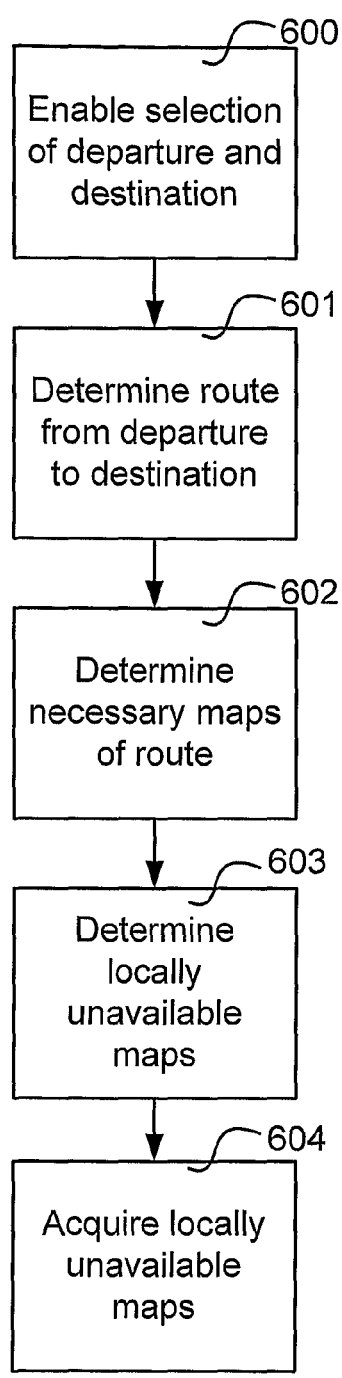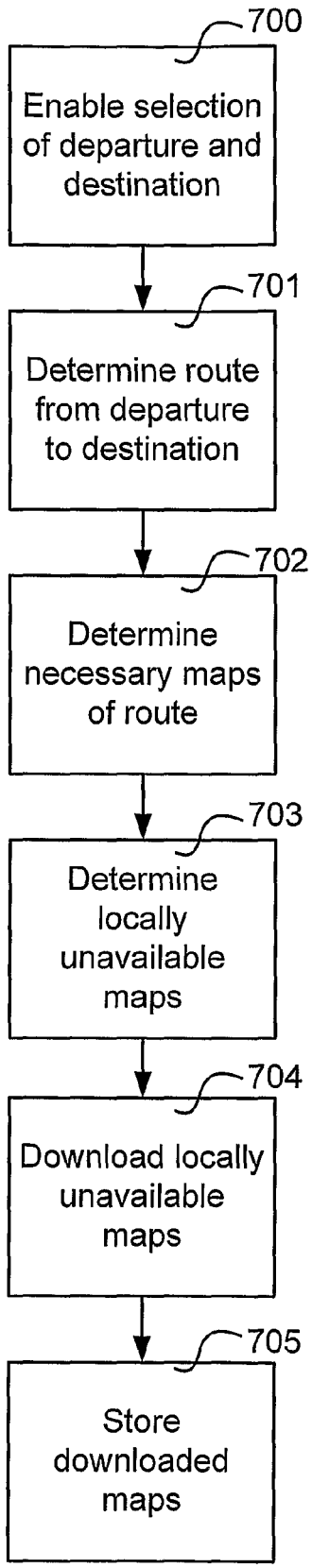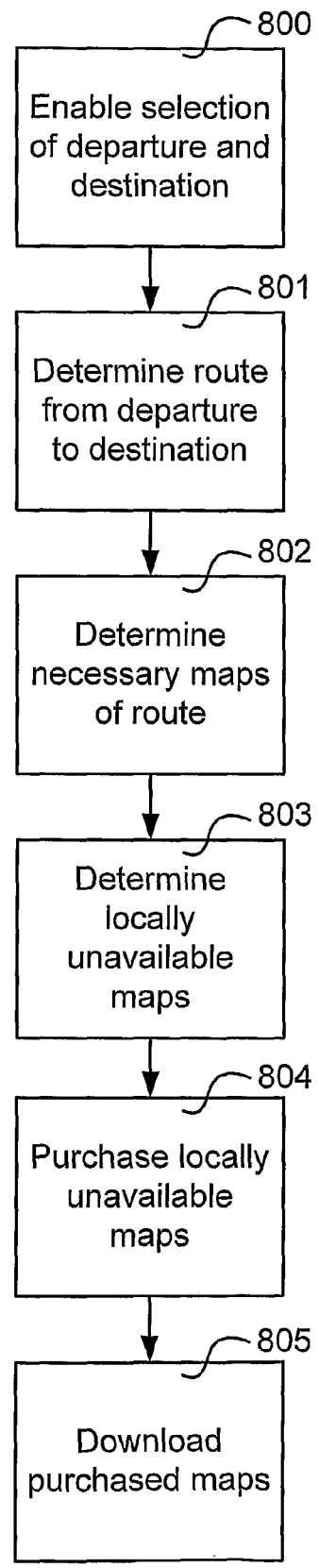
Fig. 6
Fig. 7
Fig. 8

METHOD, USER INTERFACE, APPARATUS, SERVER, SYSTEM, AND COMPUTER PROGRAM FOR PROVIDING A MAP VIEW

RELATED APPLICATION

This application was originally filed as PCT Application No. PCT/IB2007/001879 filed Jun. 25, 2007, which claims priority to U.S. Provisional Application No. 60/914,088 filed Apr. 26, 2007.

TECHNICAL FIELD

The present invention relates to a method for providing a map view, and a user interface, an apparatus, a server, a system, and a computer program for performing the method.

BACKGROUND OF THE INVENTION

Position determining and navigation are features that have been essential for human for ages. Today, electronic devices have facilitated this by provision of apparatuses able to determine position from radio signals transmitted from known positions, such as from beacons or satellites. A well known system in the art is Global Positioning System (GPS), and there are several others. Many devices of today are pre-loaded with maps, or are loaded with maps by the user before use, which consumes plenty of memory space of the apparatus and implies the risk of not having maps that cover the area where the apparatus is used, or being downloaded depending on the actual position of the apparatus, which implies the risk of shortage of maps when communication is unavailable in certain areas. Therefore, there is a need for improved map handling.

SUMMARY

In view of the above, an objective of the invention is to solve or at least reduce the problems discussed above. In particular, an objective is to make sure that maps that the user needs are available for viewing and navigation.

The present invention is based on the understanding that, on one hand, a user desires to have the maps that is needed for viewing and navigation, and on the other hand, the user is not interested in other maps, which in worst case are implying shortage of memory for other applications or degrading performance of the used apparatus, e.g. slowing it down.

According to a first aspect of the present invention, there is provided a method comprising enabling selection of a departure and a destination among a plurality of location items; determining a route between the selected departure and the selected destination; determining necessary maps for covering said route; determining locally unavailable maps among said necessary maps; acquiring said locally unavailable maps; and providing said necessary maps in a map view.

Here, it should be noted that 'unavailable' can also be in the meaning that a map is available, but the map is lacking necessary information for navigation, or other information.

The determination of said route may comprise determining manner of moving from said selected departure to said selected destination. The determination of said necessary maps depend on said manner of moving.

The acquisition of said locally unavailable maps may comprise downloading said locally unavailable maps via a communication network from a map provider, and storing downloaded maps locally. The acquisition of said locally unavailable maps may further comprise purchasing said downloaded maps. The purchase of said downloaded maps may comprise receiveing an offer to purchase the maps; confirming said offer, whereby said maps are made downloadable and payment of said maps is performed. The offer may comprise a plurality of alternatives, and said confirmation may comprise a selection among said alternatives. The alternatives may comprise any of a group comprising maps with different level of details, maps with points of interest, and turn-by-turn information.

According to a second aspect of the present invention, there is provided an apparatus comprising a navigator able to determine a position of the apparatus; a memory for storing map information; and a user interface, wherein a departure and a destination is inputtable by said user interface, said navigator is able to determine a route between said departure and said destination, and determine necessary maps for covering said route, wherein determined maps not present in said memory are acquired, and a map view with said necessary maps are provided by said user interface.

The acquisition of said maps may be performed by a communication interface of said apparatus. The communication interface may be in communication with a communication network during acquisition of said maps.

The acquired maps may be stored in said memory.

The apparatus may further comprise a purchasing module arranged to securely purchase said maps upon acquisition.

The maps may comprise any of a group comprising maps with different level of details, maps with points of interest, and turn-by-turn information.

According to a third aspect of the present invention, there is provided a map server comprising a memory comprising maps; and a communication interface, wherein said communication interface is in communication via a communication network to receive a request for a map, and upon said request transmit said requested map from said memory via said communication network.

The map server may further be arranged to transmit an offer to purchase said requested map. The map server may further be arranged to receive secure payment for transmitted maps.

According to a fourth aspect of the present invention, there is provided a system comprising a map server comprising a server memory comprising maps; and a communication interface, wherein said communication interface is in communication via a communication network to receive a request for a map, and upon said request transmit said requested map from said server memory via said communication network; and an apparatus comprising a navigator able to determine a position of the apparatus; an apparatus memory for storing map information; and a user interface, wherein a departure and a destination is inputtable by said user interface, said navigator is able to determine a route between said departure and said destination, and determine necessary maps for covering said route, wherein determined maps not present in said apparatus memory are acquired from said map server, and a map view with said necessary maps are provided by said user interface.

According to a fifth aspect of the present invention, there is provided a computer-readable medium having stored thereon a data structure, comprising control instructions for causing an apparatus to enable selection of a departure and a destination among a plurality of location items; determine a route between a selected departure and a selected destination; determine necessary maps for covering said route; determine locally unavailable maps among said necessary maps; acquire said locally unavailable maps; and provide said necessary maps in a map view.

According to a sixth aspect of the present invention, there is provided a user interface comprising a display, and an input receiver, wherein said input receiver is arranged to receive a departure and a destination input, and said display is arranged to display a determined route between said departure and said destination, and display determined acquired necessary maps for covering said route.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 2a to 2j illustrates a user interface appearance of an apparatus according to a use case of the present invention;

FIG. 3 schematically illustrates an apparatus according to an embodiment of the present invention;

FIG. 4 exemplary illustrates a computer-readable medium, from which instructions can be loaded into an apparatus;

FIG. 6 is a flow chart illustrating a method according to an embodiment of the present invention;

FIG. 7 is a flow chart illustrating a method according to an embodiment of the present invention; and FIG. 8 is a flow chart illustrating a method according to an embodiment of the present invention.

DETAILED DESCRIPTION OF PREFERRED EMBODIMENTS

Figure 1:
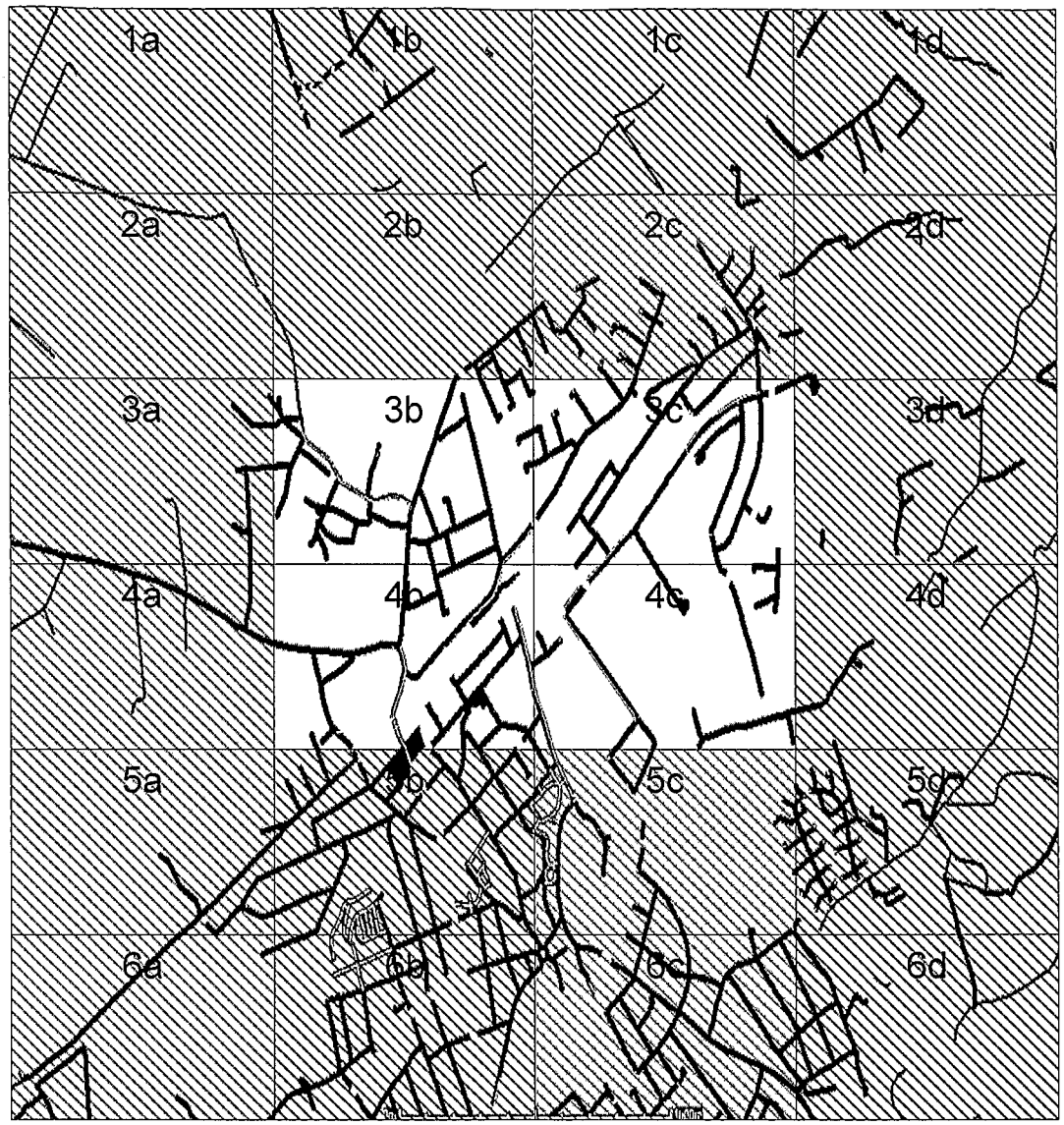
FIG. 1 illustrates a map, which is divided into partitions.

FIG. 1 illustrates a map, which is divided into partitions. The unshaded map partitions 3b, 3c, 4d, 4c illustrate map partitions that are already present in a memory of an apparatus. They may be already present in the memory since a previous download or purchase of the map partitions. The reason for not holding all the partitions 1a-6d of the map in the memory of the apparatus can be any of a memory issue, an issue of rights to the map content, or a cost issue due to purchasing of the map partitions. The shaded map partitions 1a-3a, 3d, 4a, and 4d-6d illustrate map partitions that are available for downloading and/or purchasing. This situation is well known in the art, but is demonstrated for the understanding of the examples below.

FIGS. 2a to 2j illustrates a user interface appearance of an apparatus according to a use case of the present invention. For the sake of facilitating the understanding of the use case, it is assumed that the user intends to travel from a street at the lower right part of map partition 3b in FIG. 1 to another street at the upper part of map partition 2d in FIG. 1, and references to map partitions in FIG. 2 correspond to the map partitions illustrated in FIG. 1, and it is also assumed that the locally available map partitions demonstrated in FIG. 1 are also locally available in the exemplary use case of FIG. 2.

Figure 2A:
Figure 2B:

FIG. 2a illustrates a request to a user to input a destination which the user intends to go to. In FIG. 2b, the user starts typing in the destination. This can be done by input means present on the apparatus such as a keypad, a keyboard, or any other conventional input for input of characters.

Figure 2C:
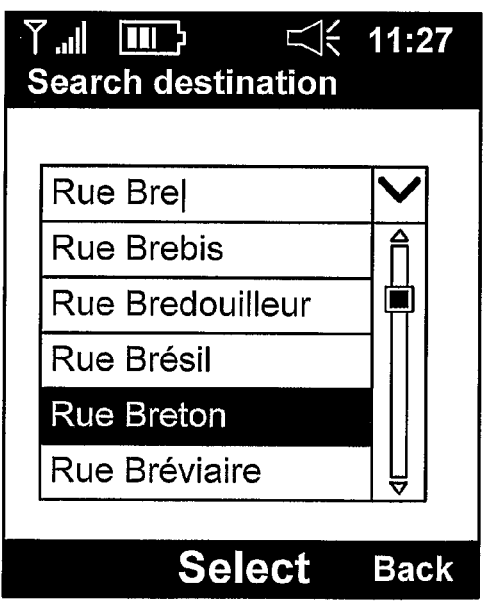

FIG. 2c illustrates that the user only has typed in the beginning of the destination name, and then gets a number of proposed destinations that match the typed beginning of the destination name. From these proposed destination names, the user is able to select the wanted destination, which in FIG. 2c is indicated by inverted text. The selection can be made by a navigation key, a rotatable input, touching a touch sensitive display, or any other conventional user interface navigation input means.

Figure 2D:
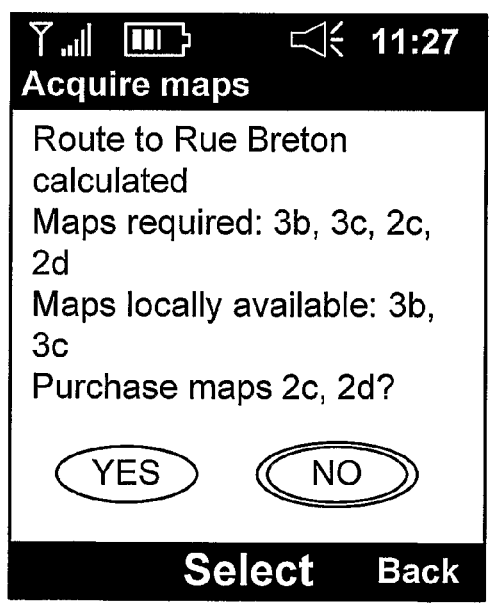
Figure 2E:
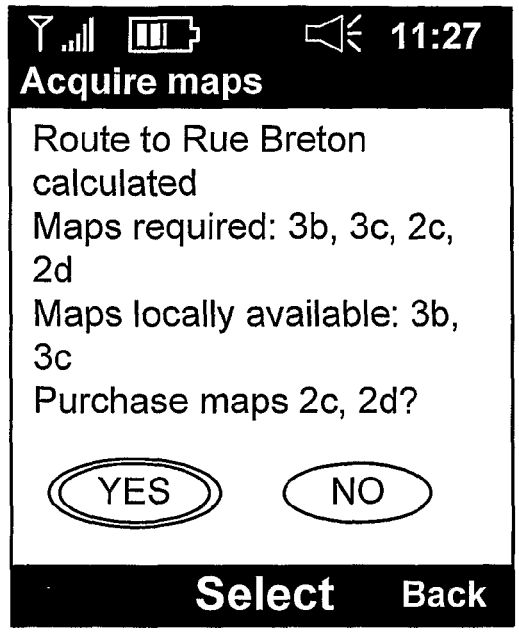
Figure 2F:
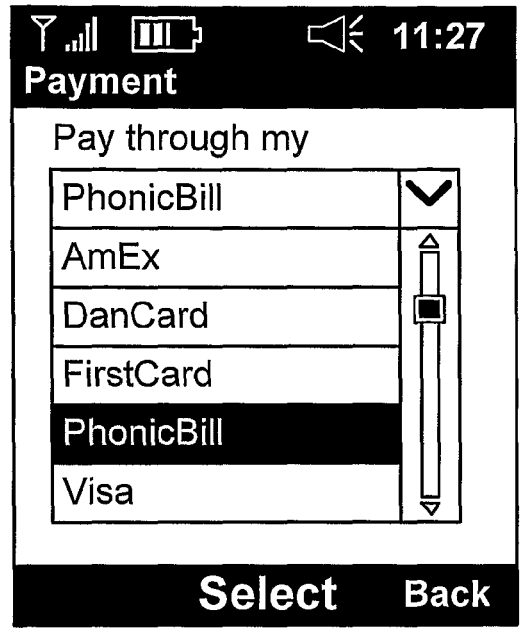
Figure 2G:
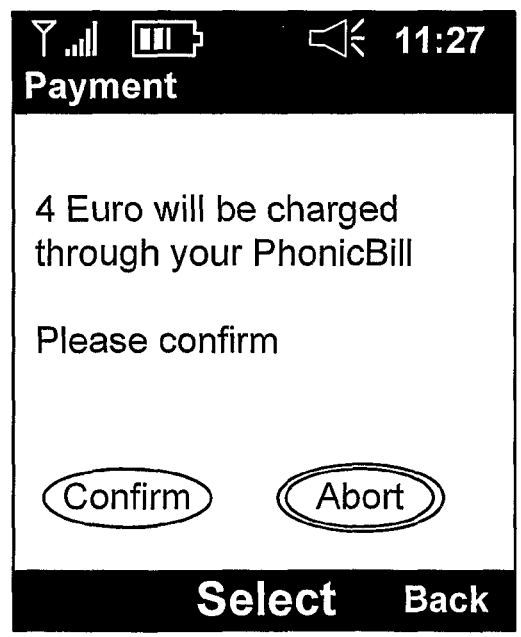

FIG. 2d illustrates that the user has chosen 'Rue Breton', and the apparatus has calculated the route to the destination from a starting position, for example the present location, which can be given by a positioning system, such as GLONASS, GPS, Galileo, or based on signals from a communication system which the apparatus is in communication with. The starting position can alternatively be input by the user. FIG. 2d further illustrates that the apparatus has determined which map partitions 3b, 3c, 2c, 2d that is required to cover the route, which of these map partitions 3b, 3c that is present in a memory of the apparatus, i.e. locally available, and which of these map partitions 2c, 2d that need to be acquired and are remotely available. The user can then be queried whether to purchase map partitions that need to be acquired. A response to the query can then be input by the user by selecting any of displayed options (YES/NO), and if the user responds that the map partitions to be acquired are to be purchased, as illustrated in FIG. 2e, a payment procedure is performed, as illustrated in FIGS. 2f to 2h, where the user can select how to pay, as illustrated in FIG. 2f, and confirm or abort the purchase, as illustrated in FIGS. 2g and 2h.

Figure 2H:
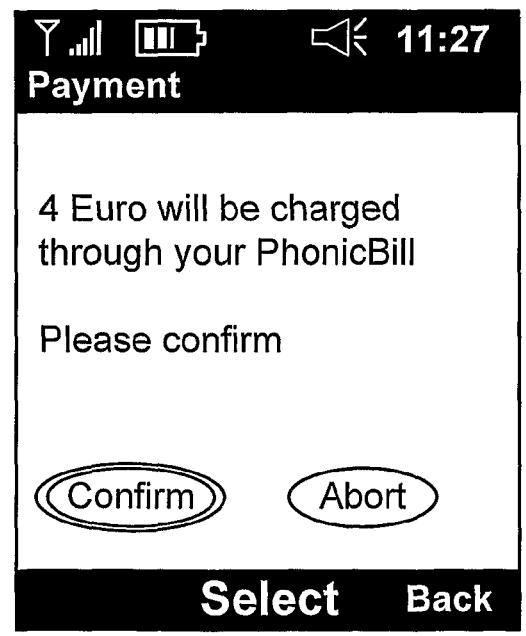

If the user confirms the purchase, as illustrated in FIG. 2h, the map partitions are downloaded to the apparatus from a map server, as illustrated in FIG. 2i. When all the map partitions that is required for the route is present in the apparatus after the download, the user can navigate, as illustrated in FIG. 2j, with help from the map partitions of the route.

The navigation can be performed as is conventional for navigators, either in a 2D mode, as illustrated in FIG. 2j, or a 3D view can be selected, where the terrain is illustrated in perspective view. Turn-by-turn information can be provided, as well as options to zoom or pan the displayed image of the terrain. These options can also be specified when purchasing the map partitions, i.e. the user has the option to, at an extra payment, receive detailed maps that can be zoomed to a more detailed level, or receive information on a turn-by-turn basis, compared to a basic level where only basic map information on a certain level of detail is provided. An alternative use case can be that the basic level is provided for free or at a flat rate, and the options are purchased similar to the purchasing demonstrated above.

FIG. 3 schematically illustrates an apparatus 300 according to an embodiment of the present invention. The apparatus 300 comprises a navigator 302, which for example is an application executed by a processor with aid from positioning means and communication means. The navigator 302 is able to access information stored in a memory 304, such as map information that is locally stored. The navigator 300 is further able to input and output information via a user interface (UI) 306, which comprises input means 308, for example a keypad, a keyboard, rotatable input means and/or any other conventional input, and output means 310, for example a speaker, a display and/or tactile output means.

The navigator can further be able to make calculations, determinations, and other actions demonstrated with reference to FIG. 2.

The apparatus 300 can be a general or dedicated computerized apparatus, such as a personal computer, a mobile phone, a digital camera, a personal digital assistant, a media player, or other similar apparatus.

The invention can be computer-implemented, i.e. invention is performed on a general or dedicated computerized apparatus, such as a personal computer, a mobile phone, a digital camera, a personal digital assistant, a media player, or other similar apparatus. Instructions for performing the invention can then be executed by the apparatus. These instructions can be loaded into the apparatus 400 from a computer-readable medium 402, as exemplary illustrated in FIG. 4, having a data structure stored. The data structure comprises the control instructions which upon execution causes the apparatus to provide a map view, including control instructions for enabling selection of a departure and a destination among a plurality of location items, determining a route between the selected departure and the selected destination. Control instructions for determining necessary maps for covering the route and for determining locally unavailable maps among the necessary maps are also present in the data structure. Control instructions for acquiring the locally unavailable maps, for example as demonstrated with reference to FIGS. 2d to 2i, are also present in the data structure.

The data structure enables determining the route, which comprises an algorithm for determining manner of moving from the selected departure to the selected destination. The data structure is further arranged to enable determination of the necessary maps based on the determined route, wherein the determination of the route, and/or the type of maps to be necessary depend on a determined manner of moving. The determination on the manner or moving can be user input, determined from map information wherein suitable manner of moving is determined, or determined from position data history, wherein the positions of the position data history are given by a positioning means of the apparatus.

The data structure includes control information on acquiring the locally unavailable maps, which comprises instructions on downloading the locally unavailable maps via a communication network from a map provider, and storing downloaded maps locally. A module of the data structure can be specially adapted for handling the acquiring of the locally unavailable maps by comprising instructions for safely purchasing the required additional maps. This can comprise mechanisms for encryption and verification. Based on this safe purchasing mechanism, the data structure can comprise executable instructions for interaction with a user and a map service provider to verify authorised purchasing, comprising receiving an offer to purchase the maps from the map service provider, and confirming the offer upon verification from the user, whereby the maps are made downloadable by the map service provider and payment of the maps is safely performed. As discussed above, the offer can comprise a plurality of alternatives, whereby the confirmation and verification from the user comprises a selection among the alternatives. The alternatives can for example comprise any of maps with different level of details, maps with points of interest, and turn-by-turn information. The data structure is preferably in form of one or more computer programs.

Figure 5:
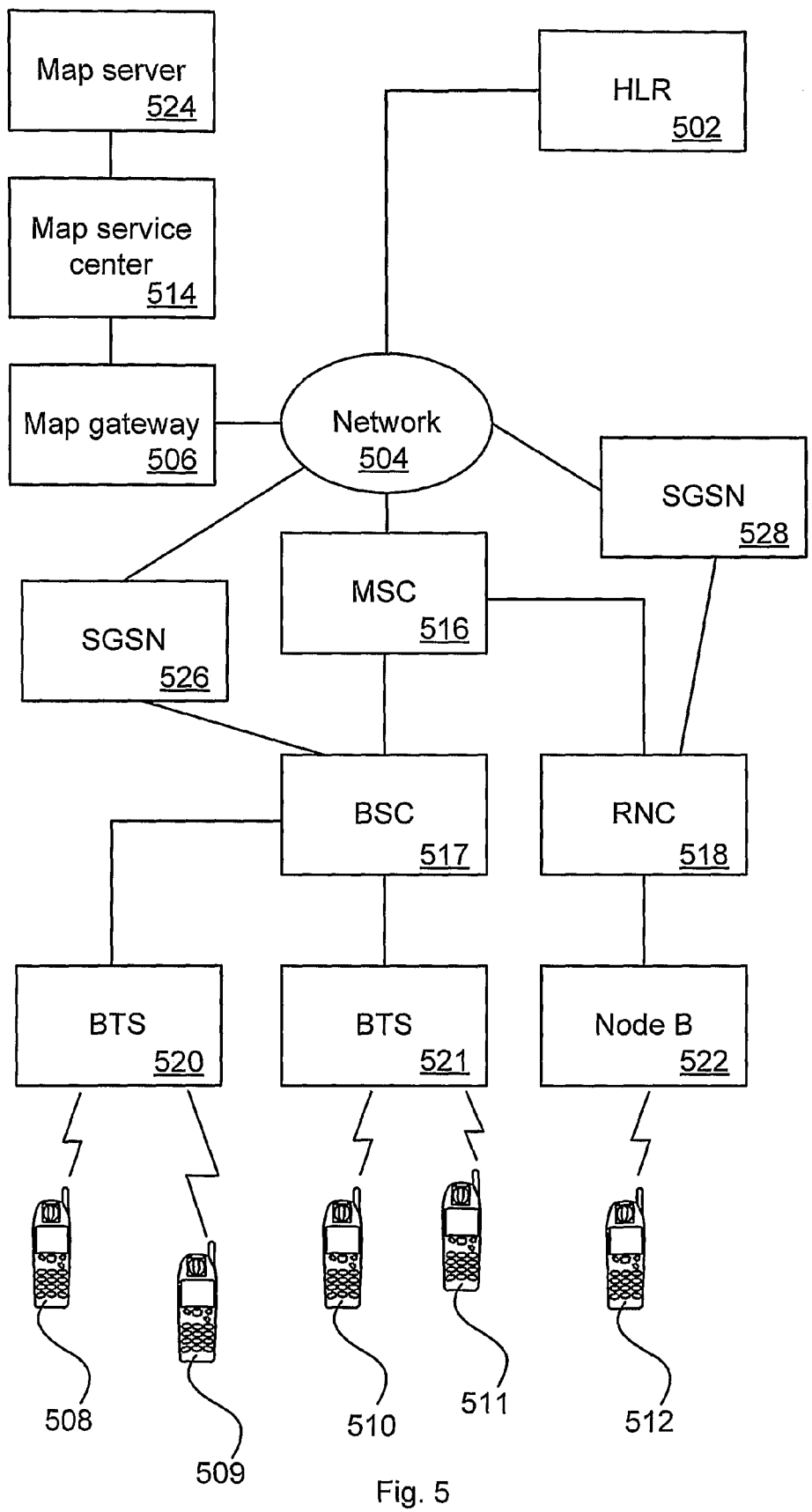
FIG. 5 is a block diagram illustrating a system according to an embodiment of the present invention.

A system architecture for managing a system 500 according to an embodiment of the present invention is shown in FIG. 5. A Home Location Register (HLR) 502 contains a database (not shown) including relevant subscriber information for provision of telecommunication service. A CCITT specified network 504 interconnects the individual parts of the system 500. A map gateway 506 is a switching unit routing a requested map to a mobile communication apparatus 508-512. The map can comprise maps with different level of details, maps with points of interest, and turn-by-turn information. An Map Service Center 514 (MaSC) and the map gateway 506 handles and routes the maps between the MaSC 514 and the network 504. From the network 504, the maps are routed to the mobile communication apparatuses 508-512 via a Mobile Switching Center (MSC) 516 to a Base Station Controller (BSC) 517 and a Base Transceiver Station (BTS) 520, 521, or a Radio Network Controller (RNC) 518 and a Node B 522. Alternatively, the maps are routed to the mobile communication apparatuses 508-512 via a Serving GPRS Support Node (SGSN) 526, 528 to the BSC 517 and the BTS 520, 521, or the RNC 518 and the Node B 522, respectively. The BTS 520, 521 or the Node B 522 establish the air connection to the mobile communication apparatuses 508-512.

According to an embodiment of the present invention, a network operator or other third party company handling a map server 524 could offer a map service function where maps or partitions of maps are purchased according to the use case demonstrated with reference to FIG. 2. For example a network operator may have a map server 524 supporting a feature where the user may send a map request from his mobile communication apparatus 508-512 to the map server 524 by using a special application of the mobile communication apparatus, e.g. a navigator application. The system can also be used for advertising companies, services, restaurants, etc. by providing them as points of interest to the provided maps.

FIG. 6 is a flow chart illustrating a method according to an embodiment of the present invention. In a selection step 600, a user is able to select destination, and possibly departure, if the departure is from another position than a current position, that can be determined by a positioning means, as discussed with reference to FIG. 3. Selection can be made from a menu, input as text, or selected on a map. In a route determination step 601, a plausible route from the departure position to the destination position is determined. In a map determination step 602, necessary maps to cover the route is determined. In a locally unavailable map determination step 603, it is determined if any of the necessary maps for covering the route is locally unavailable, i.e. not present in a memory of an apparatus on which the method is performed. Here, it should be noted that 'unavailable' can be in the meaning that a map is available, but the map is lacking necessary information for navigation, or other required information. In a map acquisition step 604, the locally unavailable map or maps are acquired, for example from a map server, as demonstrated with reference to any of FIGS. 2-4. As the necessary maps for the route is present after acquisition of locally unavailable maps, the user is able to navigate the route and/or perform other desired actions with help from the map information.

FIG. 7 is a flow chart illustrating a method according to an embodiment of the present invention. In a selection step 700, a user is able to select destination, and possibly departure, if the departure is from another position than a current position, that can be determined by a positioning means, as discussed with reference to FIG. 3. Selection can be made from a menu, input as text, or selected on a map. In a route determination step 701, a plausible route from the departure position to the destination position is determined. In a map determination step 702, necessary maps to cover the route is determined. In a locally unavailable map determination step 703, it is determined if any of the necessary maps for covering the route is locally unavailable, i.e. not present in a memory of an apparatus on which the method is performed. Here, it should be noted that 'unavailable' can be in the meaning that a map is available, but the map is lacking necessary information for navigation, or other required information. In a map downloading step 704, the locally unavailable map or maps are downloaded, for example from a map server, as demonstrated with reference to any of FIGS. 2-4. In a map storage step 705, the downloaded maps are stored in a memory of the apparatus in which the method is performed. As the necessary maps for the route is present after acquisition of locally unavailable maps, the user is able to navigate the route and/or perform other desired actions with help from the map information.

FIG. 8 is a flow chart illustrating a method according to an embodiment of the present invention. In a selection step 800, a user is able to select destination, and possibly departure, if the departure is from another position than a current position, that can be determined by a positioning means, as discussed with reference to FIG. 3. Selection can be made from a menu, input as text, or selected on a map. In a route determination step 801, a plausible route from the departure position to the destination position is determined. In a map determination step 802, necessary maps to cover the route is determined. In a locally unavailable map determination step 803, it is determined if any of the necessary maps for covering the route is locally unavailable, i.e. not present in a memory of an apparatus on which the method is performed. Here, it should be noted that 'unavailable' can be in the meaning that a map is available, but the map is lacking necessary information for navigation, or other required information. In a map purchasing step 604, the locally unavailable map or maps are purchased, for example from a map server, as demonstrated with reference to any of FIGS. 2-4. In a map downloading step 805, the purchased maps are downloaded. As the necessary maps for the route is present after purchase and downloading of locally unavailable maps, the user is able to navigate the route and/or perform other desired actions with help from the map information.

The invention has mainly been described above with reference to a few embodiments. However, as is readily appreciated by a person skilled in the art, other embodiments than the ones disclosed above are equally possible within the scope of the invention, as defined by the appended patent claims. Any combination of the elements from any of the appended claims are to be considered possible, unless otherwise explicitly stated.

The invention claimed is:

1. A method comprising:
   receiving user inputs at a user interface of a navigation device;
   operating a processor of the navigation device to cause selection of a departure location and a destination location among a plurality of location items based on the user inputs;
   operating the processor of the navigation device to determine a route between the selected departure location and the selected destination location, wherein the processor determines the route using a data structure present in the navigation device, wherein the data structure comprises control instructions executed by the processor to provide a map view, and wherein the data structure further includes control instructions executed by the processor to enable the selection of the departure and destination and to determine the route between the selected departure and destination, wherein providing the map view and determining routing are accomplished based on geographical information available on board the device, wherein the geographical information is limited by a lack of at least one locally unavailable map among maps needed for covering said route, wherein the geographical information based on which providing the map view and determining routing are accomplished comprises a plurality of maps in which the level of detail differs between maps, and in which the geographical information based on which providing the map view and determining routing are accomplished further comprises turn by turn directions;
   operating the processor of the navigation device to determine maps needed for covering said route;
   examining a memory of the navigation device to determine locally unavailable maps among said maps needed for covering said route;
   operating the processor of the navigation device to cause the navigation device to request said locally unavailable maps;
   operating the processor of the navigation device to cause the navigation device to acquire said locally unavailable maps; and
   presenting a view of said acquired maps in a user interface of the wireless communication device as needed to perform navigation.

2. The method according to claim 1, wherein determining said route comprises determining a manner of moving from said selected departure to said selected destination.

3. The method according to claim 2, wherein determining said maps needed for covering said route is based at least in part on said manner of moving.

4. The method according to claim 1, wherein acquiring said locally unavailable maps comprises downloading said locally unavailable maps from a map provider via a communication network, and storing the downloaded maps in a memory of the navigation device.

5. The method according to claim 4, further comprising communicating with a remote device to conduct a purchase transaction to acquire authorization to download said locally unavailable maps.

6. The method according to claim 5, wherein conducting said purchase transaction comprises:
   receiving an offer identifying maps available for sale;
   confirming purchase of the identified maps; and,
   transmitting payment information for said identified maps.

7. The method according to claim 6, wherein said offer comprises a plurality of alternatives and said confirmation comprises a selection among said alternatives.

8. The method according to claim 7, wherein said plurality of alternatives comprises at least one of maps with different levels of detail, maps with points of interest, and turn-by-turn information.

9. An apparatus comprising:
   a processor;
   a memory;
   computer software residing on the memory and executable by the processor, the computer software comprising a navigator able to determine a position of the apparatus through processing of navigational data;
   a memory for storing map information and accessible to the processor for rendering a position of the apparatus using a map display;

a user interface configured to receive inputs from a user, the user inputs comprising information identifying a departure and a destination location;

wherein said navigator is configured to determine a route between said departure and said destination locations, and to determine maps needed for covering said route, wherein the route is determined using a data structure present in the apparatus, wherein the data structure comprises control instructions executed by the processor to provide the map display, and wherein the data structure further includes control instructions executed by the processor to enable the selection of the departure and destination and to determine the route between the selected departure and destination, wherein providing the map display and determining routing are accomplished based on geographical information available on board the device, wherein the geographical information is limited by a lack of information available in at least one locally unavailable map among maps needed for covering said route, wherein the geographical information based on which providing the map view and determining routing are accomplished comprises a plurality of maps in which the level of detail differs between maps, and in which the geographical information based on which providing the map view and determining routing are accomplished further comprises turn by turn directions, wherein the processor is configured to identify maps that are determined to be needed for covering said route but not present in said memory, wherein the processor is configured to cause the navigation device to acquire said maps that are determined to be needed for covering said route but not present in said memory, and wherein the processor is configured to cause the user interface to present a map view including said maps.

10. The apparatus according to claim 9, wherein acquisition of said maps is performed using a wireless communication interface of said apparatus.

11. The apparatus according to claim 10, wherein said communication interface is in communication with a communication network during acquisition of said maps.

12. The apparatus according to claim 9, wherein the acquired maps are stored in said memory.

13. The apparatus according to claim 9, further comprising a purchasing module configured to communicate with a remote server to conduct a secure purchase transaction for said maps.

14. The apparatus according to claim 9, wherein said maps comprise at least one of maps with different levels of details, maps with points of interest, and turn-by-turn information.

15. A map server comprising:
a memory storing maps;
a communication interface configured to receive a request from a navigation device for a map determined by the navigation device to be necessary for covering a route determined by the navigation device based on a selection of a departure location and a destination location by a user of the navigation device, wherein the navigation device determines the route using a data structure present in the navigation device, wherein the data structure comprises control instructions executed by a processor within the navigation device to provide a map view, and wherein the data structure further includes control instructions executed by the processor to enable the selection of the departure and destination and to determine the route between the selected departure and destination, wherein providing the map view and determining routing are accomplished based on geographical information available on board the device, wherein the geographical information is limited by a lack of at least one locally unavailable map among maps needed for covering said route, wherein the geographical information based on which providing the map view and determining routing are accomplished comprises a plurality of maps in which the level of detail differs between maps, and in which the geographical information based on which providing the map view and determining routing are accomplished further comprises turn by turn directions; and a processor configured to cause the server to retrieve the requested map from the memory and direct transmission of the map to the navigation device through a communication network.

16. The map server according to claim 15, wherein the processor is further configured to cause the server to transmit an offer to conduct a purchase transaction for said identified map.

17. The map server according to claim 16, wherein the processor is further configured to cause the server to engage in communication to conduct a secure payment transaction for maps for which an offer to conduct a purchase transaction has been transmitted.

18. The map server according to claim 15, wherein said stored maps comprise maps selected from a plurality of alternatives comprising at least one of maps with different levels of detail, maps with points of interest, and turn-by-turn information.

19. A non-transitory computer-readable medium having stored thereon a data structure, comprising control instructions for causing an apparatus to:
establish communication with a wireless network in which the apparatus operates;
receive user inputs at a user interface of the apparatus;
select a departure location and a destination location among a plurality of location items based on the user inputs;
determine a route between the selected departure and the selected destination locations, wherein the determining the route uses a data structure present in the apparatus, wherein the data structure comprises control instructions executed by a processor within the apparatus to provide a map view, and wherein the data structure further includes control instructions executed by the processor to enable the selection of the departure and destination and to determine the route between the selected departure and destination, wherein providing the map view and determining routing are accomplished based on geographical information available on board the device wherein the geographical information is limited by a lack of at least one locally unavailable map among maps needed for covering said route, wherein the geographical information based on which providing the map view and determining routing are accomplished comprises a plurality of maps in which the level of detail differs between maps, and in which the geographical information based on which providing the map view and determining routing are accomplished further comprises turn by turn directions;
determine maps for covering said route;
examine a memory of the apparatus to determine locally unavailable maps among said maps;
communicate with a server of the wireless communication network to identify said locally unavailable maps;

acquire said locally unavailable maps through a transmission received from the wireless communication server; and present a view of said maps in a user interface of the wireless communication device as needed to perform navigation.

* * * * *